United States Patent Office  
3,488,973  
Patented Jan. 13, 1970

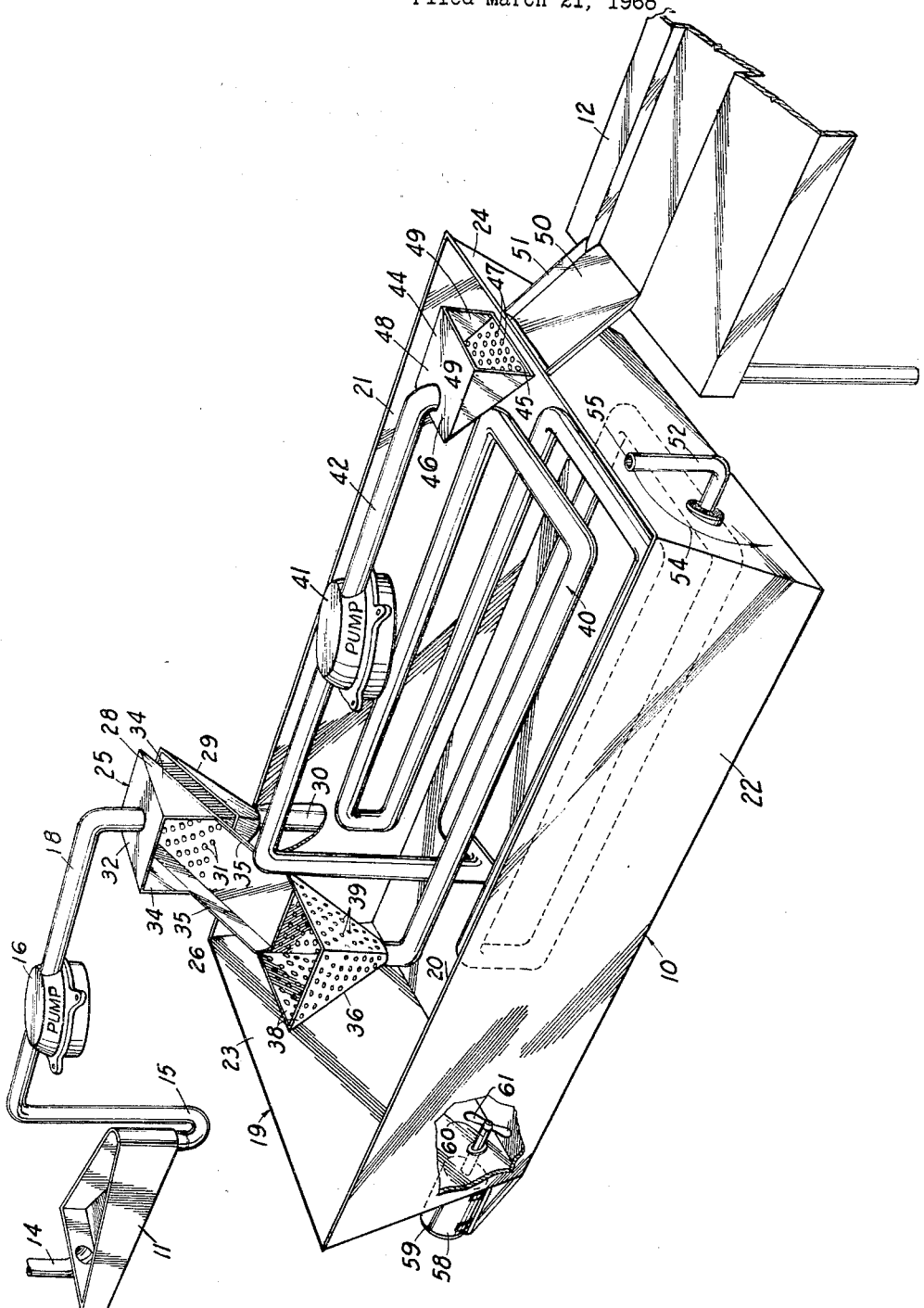

---

3,488,973
TUBULAR TYPE GIBLET CHILLER
Grover S. Harben, Jr., Gainesville, and Thomas H. Wright, Decatur, Ga., assignors to Gainesville Machine Company, Inc., Gainesville, Ga., a corporation of Georgia
Filed Mar. 21, 1968, Ser. No. 721,131
Int. Cl. F25d 13/06, 17/02; B65g 51/00
U.S. Cl. 62—63         12 Claims

ABSTRACT OF THE DISCLOSURE

A tubular giblet chiller including a cooling tank for containing a mixture of water and ice, a water changer positioned at the edge of the cooling tank for receiving a slurry containing giblets for discharging the water of the slurry to a point outside the cooling tank and depositing the giblets in the cooling tank, a perforated hopper positioned with its side walls intersecting the normal water level in the tank for receiving the giblets, a conduit system communicating at one of its ends with the bottom of the perforated hopper and extending throughout a major portion of its length through a tortuous path below the normal water level, and a second water changer positioned adjacent the edge of the cooling tank, at the other end of the conduit system for receiving the giblets from the conduit system and discharging the giblets from the tank while directing the water from the conduit system back into the tank.

BACKGROUND OF THE INVENTION

In a chicken processing plant where chickens are defeathered, processed and packaged for shipment to the market place, the viscera is removed from the cavity of the carcass of the chickens, the edible viscera or giblets separated from the inedible viscera, and the edible viscera is packaged and reinserted into the cavity of the chicken. The giblets must be washed and handled carefully to avoid bruising and deterioration in order to be acceptable and the chickens are usually packed in ice for shipment to the market place.

When processing giblets it is desirable to not only clean and wash the giblets, but also to chill or cool the giblets prior to recombining the giblets with the chicken carcass. This cleaning and cooling process is necessary to prevent the giblets from spoiling during storage and shipment. While the cleaning process can be carried out by hand, the cooling of the giblets usually requires that they be emersed in a cooling liquid, such as ice water, prior to being packaged. This usually requires that the giblets be retrieved from a tank of water, usually by hand, and the water drained away.

SUMMARY OF INVENTION

This invention comprises a tubular type giblet chiller which passes giblets, in slurry form, through a refrigerated conduit system to effect the cooling process. The giblets are initially pumped from a receiving tray or hopper where they have been mixed water to form a slurry, toward a cooling tank filled with water and ice. The slurry is deposited onto a drain board where the water is separated from the giblets and drained away, while the giblets are deposited in the cooling tank. A perforated hopper is positioned in the cooling tank so that the level of the ice and water intersects its sides, and the conduit system has one of its ends connected to the bottom of the hopper. The giblets are delivered to the hopper and passed to the conduit system together with water from the cooling tank to form a second or cooling slurry. A major portion of the conduit system is submerged below the level of water and ice in the cooling tank so that the giblets are further cooled in the conduit system, and as the giblets reach the other end of the conduit system they are deposited onto a second drain board, whereupon the cooling water is drained back into the cooling tank while the giblets are discharged onto a handling table.

Thus, it is an object of this invention to provide a tubular type giblet chiller for cooling and cleaning giblets.

Another object of this invention is to provide a method and apparatus for cooling and cleaning giblets, wherein the giblets are transported in slurry form, and the liquid of the slurry functions to clean and cool the giblets.

Another object of this invention is to provide a method and apparatus for cooling and cleaning giblets which is inexpensive to manufacture, economical to operate, and requires a minimum of attention from the workers in the processing plant.

Other objects, features and advantages of the present invention will become apparent upon reading the following specification, when taken in conjunction with the accompanying drawing.

BRIEF DESCRIPTION OF THE DRAWING

FIG. 1 is a schematic perspective view of the tubular giblet chiller, with parts broken away.

DESCRIPTION OF THE PREFERRED EMBODIMENT

Referring now more particularly to the drawing, FIG. 1 shows giblet chiller 10 positioned between a receiving hopper 11 and a stuffing and wrapping table 12. Hopper 11 may be of any conventional configuration and merely functions to receive giblets either in dry or slurry form from previous processing stages. If necessary, water can be mixed with the giblets from source 14, so that a slurry is present in hopper 11. Conduit 15 communicates at one of its ends with the lower portion of receiving hopper 11, and at its other end with pump 16. Pump 16 is a diaphragm pump which is suitable for pumping the slurry without damaging the giblets. The outlet of pump 16 communicates with delivery conduit 18, which extends toward cooling tank 19.

Cooling tank 19 is a rectangular water tight tank and includes a bottom wall 20, side walls 21 and 22, and end walls 23 and 24. Delivery conduit 18 communicates with water changer 25 which is positioned adjacent side wall 21. Water changer 25 includes a drain board 26, triangular splash housing 28, funnel 29, and drain conduit 30. Drain board 26 is positioned at an inclined angle and extends toward the internal portion of cooling tank 19. Funnel 29 is positioned below the upper portion of drain board 26, and the upper portion of drain board 26 defines a plurality of space apertures 31. The lower portion of drain board 26 is substantially imperforate. Splash housing 28 receives delivery conduit 18 through its horizontally extending top wall 32, and its side walls 34 are connected to the upper portion of drain board 26. Guide walls 35 extend from side walls 34 of splash housing 28, on each edge of drain board 26, to the lower end of drain board 26. With this arrangement, the slurry delivered to water changer 25 from delivery conduit 18 is deposited on the upper portion of drain board 26, where the water is drained through apertures 31 into funnel 29 and drain conduit 30. The giblets from the slurry will tumble down drain board 26, toward cooling tank 19.

Perforated hopper 36 is positioned at the end of drain board 26 and includes side walls 38 defining space apertures 39. Hopper 36 is positioned in cooling tank 19 at a level so that its side walls 38 intersect the normal water line of the water in cooling tank 19. Thus, water from cooling tank 19 will pass through apertures 39, into hopper 36, and mix with the giblets being discharged from water changer 25, to form a second slurry.

Conduit system 40 is positioned in cooling tank 19, and communicates at one of its ends with perforated hopper 36. Conduit system 40 defines a tortuous path below the normal water level in cooling tank 19 throughout a major portion of its length, and communicates at its discharge end with pump 41. Pump 41 is a diaphragm pump, similar to pump 16, and its discharge communicates with delivery conduit 42. Delivery conduit 42 communicates with water changer 44, which comprises drain board 45 and splash housing 46. Drain board 45 defines a plurality of spaced apertures 47, is disposed at an inclined angle above cooling tank 19 at end wall 24, and splash housing 46 receives delivery conduit 42 through its horizontally extending top wall 48, and its triangular side walls 49 are connected to the edges of drain board 45. Chute 50 extends between stuffing and wrapping table 12 and end wall 24 of cooling tank 19, adjacent water changer 44. Chute 50 extends at an inclined angle generally co-extensive with drain board 45, downwardly from the upper edge of end wall 24 toward table 12. With this construction, the slurry delivered from delivery conduit 42 to water changer 44 is deposited onto drain board 45, where the water of the slurry is drained back into cooling tank 19, while the giblets tumble over drain board 45, over chute 50, onto stuffing and wrapping table 12. Raised edges 51 on each side of chute 50 keep the giblets from falling off the edge of chute 50 as they travel toward stuffing and wrapping table 12.

Cooling tank 19 is filled with a mixture of water and ice, either manually or by a conventional ice machine and water inlet, and the level of water in the cooling tank 19 is maintained at the desired level by means of pivotal overflow conduit 52 extending through end wall 24. Overflow conduit 52 is L-shaped, and as indicated by arrow 54, can be pivoted so that its open end 55 can be elevated to various levels. With this arrangement, if it is desired to drain some water from cooling tank 19 to lower the level of the water, overflow conduit 52 is pivoted in the direction as indicated by arrows 54 so that its open end 55 is lowered. When the open end 55 is positioned below the water level within cooling tank 19 the water will pass through overflow conduit 52. When the water level is depressed to the level of open end 55 of conduit 52, the discharge of water through conduit 52 will terminate. Thus, the level of water within cooling tank 19 can be maintained at virtually any level desired by manipulation of conduit 52.

Agitator 58 is connected to end wall 23, and includes motor 59 positioned outside cooling tank 19, shaft 60 extending through end wall 23, and propeller 61 connected to the end of shaft 60. Motor 59 functions to rotate propeller 61 so that the mixture of water and ice normally contained within cooling tank 19 is stirred to insure proper heat transfer between the ice and water.

OPERATION

Cooling tank 19 is filled with a mixture of ice and water, to a level where the water intersects the side walls 38 of perforated hopper 36. Thus, the water will pass through the spaced apertures 39 of hopper 36, and enter conduit system 40. Agitator 58 is energized so that its propeller 61 continuously circulates the ice and water in cooling tank 19, thus assuring that the water in cooling tank 19 is maintained at a low temperature. Since propeller 61 is located in a lower portion of cooling tank 19, and since ice normally floats in water, propeller 61 will normally rotate freely without interference from large chunks of ice.

The giblets being processed through the plant will be deposited into receiving hopper 11. The giblets will normally be received in hopper 11 in slurry form, since water and other liquids are normally utilized in the preceding stages in the processing plant; however, if additional water is necessary, it can be provided through water conduit 14.

The slurry in receiving hopper 11 is pumped by pump 16 through conduits 15 and 18 to water changer 25. The water of the slurry is drained through the spaced apertures defined in drain board 26 to funnel 29, and discharged through drain conduit 30. The giblets tumble down the drain board 26 into perforated hopper 36 in cooling tank 19. Since the water level in cooling tank 19 intersects side walls 38 of hopper 36, the giblets will be mixed with the cold water of cooling tank 19, to form a cold slurry. Pump 41 functions to pump the cold slurry from perforated hopper 36, through conduit system 40, and discharge the cold slurry to water changer 44. Drain board 45 functions to drain the water from the cold slurry back into cooling tank 19, and the giblets from the cold slurry will tumble down drain board 45, onto chute 50, and stuffing and wrapping table 12.

Diaphragm pump 16 which delivers the first slurry from receiving hopper 11 to water changer 25 functions to gently agitate the slurry, yet is gentle enough so that the giblets are not bruised or otherwise damaged. The function of pump 16 is such that the giblets are virtually washed by the liquid of the slurry, to loosen any debris or sediment clinging to the giblets. The amount of water of the slurry is controlled by water inlet conduit 14. Of course, the delivery of the giblets to receiving hopper 11 may be sporadic, so that only a few giblets are present in hopper 11 at sometimes while at other times hopper 11 may be substantially full of giblets. The water added to hopper 11 through water conduit 14 insures that enough water will be present at all times in hopper 11 to act as a carrier, so that a slurry is always present in hopper 11 for pump 16.

When the first slurry is deposited in water changer 25, the water of the slurry which is usually somewhat contaminated with blood is drained away from the giblets. When the giblets are received in perforated hopper 36, the cold water from cooling tank 19 forms a cold, clean slurry with the giblets.

As the giblets pass through conduit system 40 below the level of ice and water in cooling tank 19, the giblets are cooled by both the water in cooling tank 19 and the water entrained with the giblets at hopper 36. Thus, when the cold slurry is deposited in water changer 44, the giblets will have been thoroughly chilled and washed.

At this point, it should be apparent that the giblet chiller disclosed herein functions to automatically wash and chill the giblets without bruising or otherwise damaging the giblets, and with a minimum of attention from the workers in the processing plant.

It will be obvious to those skilled in the art that many variations may be made in the embodiment chosen for the purpose of illustrating the present invention without departing from the scope thereof as defined by the appended claims.

We claim:
1. Apparatus for cooling giblets comprising:
a cooling tank defining an area of low temperature,
a first water draining means for receiving a slurry of giblets, including means for separating the giblets from the liquid of the slurry and directing the giblets to the cooling tank and directing the liquid away from the cooling tank,
a mixing member in the cooling tank for receiving the giblets and mixing the giblets with cold water to form a cold slurry,
a conduit system for transporting by hydraulic pressure the cold slurry through the area of low temperature of the cooling tank, and
a second water draining means for receiving the cold slurry from the conduit system, including means for separating the giblets from the water of the cold slurry and discharging the giblets from the cooling tank.

2. The invention of claim 1 wherein said cooling tank comprises a water tight tank adapted to contain a mixture of water and ice and wherein said first water draining means comprises a plate disposed at inclined angle at the edge of the cooling tank, having its upper portion extending outside the confines of the cooling tank wall and defining a plurality of openings therein and its lower portion extending inside the confines of the cooling tank wall, and wherein said second water draining means comprises a plate disposed at an inclined angle at the edge of the cooling tank, having its lower portion extending outside the confines of the cooling tank wall and its upper portion extending inside the confines of the cooling tank wall and defining a plurality of openings therein.

3. The invention of claim 1 wherein said mixing member comprises a perforated hopper.

4. The invention of claim 1 wherein said conduit system includes a diaphragm pump for transporting the slurry through the cooling tank.

5. The invention of claim 1 wherein said cooling tank is constructed and arranged to contain a mixture of ice and water and wherein a major portion of said conduit system is positioned at a level below the normal level of the ice and water in the cooling tank.

6. The invention of claim 5 and further including agitating means for circulating the ice and water in the cooling tank.

7. The invention of claim 5 and further including water level control means for maintaining the mixture of ice and water at a selected level.

8. Apparatus for cooling giblets or the like comprising:
   a cooling tank having an open upper end for containing a mixture of ice and water,
   means for mixing giblets with the water in the cooling tank,
   conduit means for receiving and transporting by hydraulic pressure the mixture through a path normally disposed below the level of the ice and water in the cooling tank, and
   means for separating the giblets from the water and discharging the giblets from the cooling tank.

9. Apparatus for treating giblets comprising:
   means for mixing the giblets with a first liquid to form a first slurry,
   a cooling tank,
   means for transporting the giblets to the cooling tank,
   means for separating the giblets from the first liquid and depositing the giblets in the cooling tank,
   means for mixing the giblets with a cooling liquid to form a second slurry,
   means for transporting by hydraulic pressure the second slurry in a tortuous path within the cooling tank and in heat exchange relation with said cooling liquid, and
   means for separating the cooling liquid of the second slurry from the giblets and discharging the giblets from the cooling tank.

10. Apparatus for treating giblets comprising:
    a tank for containing a mixture of water and ice at a predetermined level,
    a perforated hopper positioned in said tank at a level where the predetermined level of the water intersects the sides of the hopper for receiving a mixture of giblets and water,
    a conduit system communicating at one of its ends with the bottom of the hopper and extending throughout a majority of its length through a tortuous path below the predetermined level for transporting the mixture through the tank below the level of water, and
    a perforated drain board positioned above the predetermined level at the other end of the conduit system for receiving the mixture and separating the giblets from the water.

11. A tubular giblet chiller including a cooling tank for containing a mixture of water and ice, a water changer positioned at the edge of the cooling tank for receiving a slurry containing giblets for discharging the water of the slurry to a point outside the cooling tank and depositing the giblets in the cooling tank, a perforated hopper positioned with its side walls intersecting the normal water level in the tank for receiving the giblets, a conduit system communicating at one of its ends with the bottom of the perforated hopper and extending throughout a major portion of its length through a tortuous path below the normal water level, and a second water changer positioned adjacent the edge of the cooling tank at the other end of the conduit system for receiving the giblets from the conduit system and discharging the giblets from the tank and directing the water from the conduit system back into the tank.

12. A method of cooling giblets comprising:
    mixing the giblets with water to form a first slurry,
    transporting the first slurry to a cooling area,
    draining a major portion of the liquid from the first slurry to a point outside the cooling area,
    mixing the giblets with cold water to form a second slurry,
    transporting by hydraulic pressure the second slurry through the cooling area,
    draining a major portion of the liquid from the second slurry, and
    discharging the giblets.

References Cited

UNITED STATES PATENTS

| 2,116,738 | 5/1938 | Zhrotschenzeff | 62—63 |
| 2,263,452 | 11/1941 | Birdseye | 62—63 |
| 3,250,086 | 5/1966 | Morris | 62—64 X |

FOREIGN PATENTS

| 189,679 | 5/1967 | U.S.S.R. |

WILLIAM E. WAYNER, Primary Examiner

U.S. Cl. X.R.

62—375; 99—198; 302—2